Patented Oct. 28, 1930

1,780,058

UNITED STATES PATENT OFFICE

FRITZ BALLAUF, OF ELBERFELD, GERMANY, ASSIGNOR TO GENERAL ANILINE WORKS, INC., OF NEW YORK, N. Y., A CORPORATION OF DELAWARE

HYDRINDOLE-INDOPHENOLS AND PROCESS OF MAKING THE SAME

No Drawing. Application filed October 25, 1926, Serial No. 144,188, and in Germany November 2, 1925.

My invention pertains to processes of producing indophenol compounds containing a dihydroindole nucleus and to these novel indophenol compounds themselves.

Aromatic para-amino-hydroxy compounds are known to condense by various reactions with aromatic amines to form indophenols or the corresponding leucoindophenols.

I have now found that by replacing the known aromatic amines in these reactions by certain dihydroindole compounds novel and very valuable indophenolic bodies are obtained. This was quite unexpected, as the corresponding unhydrogenated indoles do not behave in the same manner and it has not been possible yet to produce indophenolic bodies from such indoles.

The dihydroindoles which I found to readily react with aromatic para-amino-hydroxy compounds to form indophenolic bodies are of the general formula:

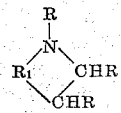

In this formula R stands for hydrogen, or an aryl, alkyl or, an aralkyl, group—

$R_1$ stands for a benzene nucleus, which may be substituted e. g. by alkyl, aryl, aralkyl halogen or other monovalent group.

The reactions by which these dihydroindole compounds produce indophenolic bodies are mainly joint oxidation with p-aminophenols, condensation with quinone chloroimids or condensation with p-nitroso-phenols and I wish it to be understood that for purposes of this invention the term aromatic para-amino-hydroxy compounds is meant to embrace such p-amino-phenols, quinonechloro-imids and p-nitroso-phenols.

In these reactions the indophenols are primarily formed. They dissolve in aqueous alkalis with intense red to blue colors.

Reducing agents precipitate from the solutions of the indophenols the corresponding leuco compounds. These novel leucoindophenols, containing the dihydroindole nucleus, are usually yellow colored crystalline substances, easily soluble in water, alcohol and sulfuric acid, but much less soluble in salt solutions. They form colorless solutions with aqueous alkalies, in which the leucoindophenol is easily oxidized, even in contact with atmospheric oxygen, to the corresponding dark colored indophenols.

The most probable formula for these leucoindophenols is the following:

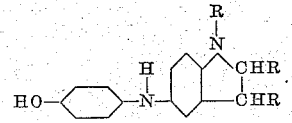

in which R stands for hydrogen or, an alkyl, aryl or, aralkyl group.

These novel dihydroindole-indophenolic bodies produce in the polysulfide melt very valuable sulfur dyestuffs which are described and claimed in my co-pending application, Serial No. 144,187 filed of even date, which has matured into Patent 1,725,046 dated Aug. 20, 1929.

Bath the indophenols and their leuco derivatives produce the same dyestuffs, the indophenol being probably primarily reduced in the polysulfide melt to the leuco compound.

Due to this similar behavior and the ease with which the indophenols and their leuco compounds are converted one into the other I wish it to be understood that the term indophenolic body is used herein as generic to both the indophenols and their leuco derivatives.

Amongst the different processes described above which lead to my novel dihydroindoleindophenols I might mention as particularly useful the joint oxidation of a dihydroindole compound with a p-amino-phenol in aqueous mineral acid solution by means of an alkali metal bichromate, though in certain instances condensation with a quinone-chloro-imid or a p-nitroso-phenol might be preferred. Substantially identical indophenolic bodies are however produced when using the specified raw materials.

2-alkyl- or 2-aryl-dihydroindoles of the

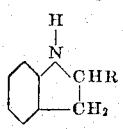

formula in which R stands for an alkyl or aryl radicle, produce with p-amino-phenols indophenolic bodies found particularly suited for the production of valuable dyestuffs.

The 2-aryl- or 2-alkyl-dihydroindole-indophenolic bodies have in the form of their leuco compounds most probably the formula:

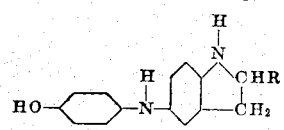

These leuco compounds crystallize from diluted sodium chloride solutions in yellow needles. Their alkaline solutions are easily oxidized by atmospheric oxygen, forming intense red solutions of the corresponding indophenols.

The following examples will further illustrate my invention, the parts being by weight.

*Example 1.*—20 parts 2-monomethyl-dihydroindole are suspended in 600 parts water and dissolved by the additon of about 370 parts 19° Bé. hydrochloric acid; a hydrochloric acid solution of 16 parts p-amino-phenol and then about 34 parts 60° Bé. sulfuric acid added. This solution is then quickly run into an ice cold aqueous solution of 29 parts sodium bichromate and about 120 parts 30% caustic soda solution added. A dark red solution of the indophenol is obtained; this is reduced to the leuco compound by the addition of sodium sulfhydrate, whereby the dark red color of the solution turns to a light yellow. This solution is then acidified with mineral acid to distinct Congo acid reaction, heated to 60° C., plenty of salt added and allowed to cool. The light yellow colored 2-monomethyl-dihydroindole-leucoindophenol separates, is filtered off and washed with a sodium chloride solution.

It is easily soluble in water, alcohol and sulfuric acid and crystallizes from a dilute sodium chloride solution in beautiful needles. It forms with aqueous caustic soda a colorless solution, which by standing in the air soon turns intense red with formation of the indophenol.

The 2-monomethyl-dihydroindole-leuco-indophenol has most probably the formula:

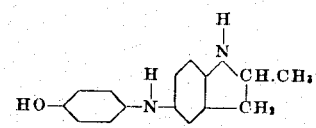

*Example 2.*—17 parts dihydroindole are suspended in 600 parts water and dissolved by the addition of about 370 parts 19° Bé. hydrochloric acid; a hydrochloric acid solution of 16 parts p-amino-phenol and then 34 parts 60° Bé. sulfuric acid are added. The solution is now quickly run into an ice cold aqueous solution of 29 parts sodium bichromate and about 120 parts 30% caustic soda solution added. A dark red solution of the indophenol is obtained, this is reduced to the leuco compound by the addition of sodium sulfhydrate, whereby the dark red color of the solution turns to a light yellow. This solution is then acidified with mineral acid to distinct Congo acid reaction, heated to about 60° C., plenty of ice added and allowed to cool. The yellow colored dihydroindole-leuco-indophenol separates and is filtered off and washed with a sodium chloride solution.

The so obtained leucoindophenol is a yellow powder, which by crystallization from a dilute sodium chloride solution is obtained as beautiful needles. It is easily soluble in water, alcohol and sulfuric acid. It forms with aqueous caustic soda a colorless solution, which by standing in the air soon turns intense red with formation of the indophenol.

The dihydroindole-leucoindophenol has most probably the formula:—

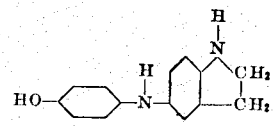

*Example 3.*—20 parts 2-monophenyl-dihydroindole are suspended in 600 parts water and dissolved by the addition of about 370 parts 19° Bé. hydrochloric acid; a hydrochloric acid solution of 16 parts p-amino-phenol and about 34 parts 60° Bé. sulfuric acid are now added. This solution is then quickly run into an ice cold aqueous solution of 29 parts sodium bichromate and about 120 parts 30% caustic soda added. A dark red solution of the indophenol is obtained; this is reduced to the leuco compound by the addition of sodium sulfhydrate, whereby the dark red color of the solution turns to a light yellow. The solution is then acidified with mineral acid to distinct Congo acid reaction, heated to about 60° C., plenty of salt added and allowed to cool. The yellow colored 2-monophenyl-dihydroindole-leucoindophenol separates, it is filtered off and preferably washed with a sodium chloride solution. The so obtained 2-monophenyl-dihydroindole - leucoindophenol is a yellow powder, which by crystallization from diluted sodium chloride solution is obtained as beautiful needles. It is easily soluble in water, alcohol and sulfuric acid. It forms with aqueous caustic soda a colorless solution, which by standing in the air soon becomes intense red with formation of the indophenol.

The 2-monophenyl-dihydroindole-leucoindophenol has most probably the formula:

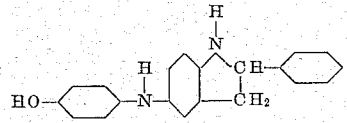

*Example 4.*—22 parts 1-2-dimethyl-dihydroindole are suspended in 600 parts water and dissolved by the addition of about 370 parts 19° Bé. hydrochloric acid, a hydrochloride solution of 16 parts p-amino-phenol, and about 34 parts 60° Bé. sulfuric acid are now added. This solution is now quickly run into an ice cold aqueous solution of 29 parts sodium bichromate and about 120 parts 30% caustic soda added. A blue solution of the indophenol is obtained; this is reduced to the leuco compound by the addition of sodium sulfhydrate, whereby the blue color of the solution turns to a light yellow. This solution is then acidified with mineral acid to distinct Congo acid reaction, heated to 60° C., plenty of salt added and allowed to cool. The yellow colored 1-2-dimethyl-dihydroindole-leucoindophenol separates, is filtered off and preferably washed with a sodium chloride solution.

The so obtained leucoindophenol is a yellowish powder, which by crystallization from dilute sodium chloride solution is obtained as beautiful needles. It is easily soluble in water, alcohol and sulfuric acid. It forms with aqueous caustic soda a colorless solution, which by standing in the air soon becomes intense blue with formation of the indophenol.

The 1-2-dimethyl-dihydroindole-leucoindophenol has most probably the formula:—

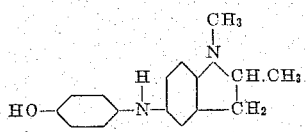

*Example 5.*—20 parts 2-monomethyl-dihydroindole are suspended in 600 parts water and dissolved by the addition of about 370 parts of 19° Bé. hydrochloric acid, a solution of 37 parts 2-6-dichloro-p-aminophenol sulfate and about 34 parts 60° Bé. sulfuric acid are now added. This solution is now quickly run into an ice cold aqueous solution of 29 parts bichromate and about 120 parts 30% caustic soda added. A dark red solution of the indophenol is obtained, this is reduced to the leuco compound by the addition of sodium sulfhydrate, whereby the dark red color of the solution turns to a light yellow. This solution is then acidified with mineral acid to distinct Congo acid reaction, heated to 60° C., plenty of salt added and allowed to cool. The yellow colored 2-mono-methyl-dihydroindole-leuco-dichloro-indophenol separates. It is filtered off and preferably washed with a sodium chloride solution.

The so obtained leuco indophenol is a yellowish powder, which by crystallization from dilute sodium chloride solution is obtained as beautiful needles. It is easily soluble in water, alcohol and sulfuric acid. It forms with aqueous caustic soda a colorless solution, which by standing in the air turns intense red with formation of the indophenol.

The 2-methyl-dihydroindole-leuco-dichloro-indophenol has most probably the formula:—

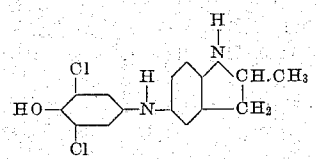

*Example 6.*—550 parts 66° Bé. sulfuric acid are cooled to about 10° C. and 20 parts 2-monomethyl-dihydroindole added followed by a gradual addition of 20 parts quinone chlor-imid. The reaction mass is stirred for a short while, then poured into caustic soda and reduced with sodium sulfhydrate until the deep red solution of the indophenol has been transformed into the light yellow solution of the leucoindophenol. It is then acidified with mineral acid to distinct Congo acid reaction, plenty of salt added and allowed to cool. The yellow colored 2-monomethyl-dihydroindole-leucoindophenol separates, it is filtered off and preferably washed with a sodium chloride solution. It is identical with the leucoindophenol obtained in Example 1.

I claim:

1. The process of producing a dihydro-indole indophenolic body which comprises subjecting a dihydro-indole of the formula

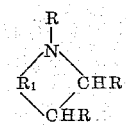

wherein R stands for hydrogen, an alkyl, aryl or an aralkyl group and $R_1$ stands for a benzene nucleus which may be substituted by alkyl, aryl, aralkyl, halogen or other monovalent group, and an aromatic para-amino-hydroxy compound to a reaction leading to the formation of an indophenol.

2. The process of producing a dihydro-indole-indophenolic body which comprises subjecting a dihydroindole of the formula:

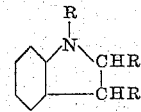

wherein R stands for hydrogen, an alkyl, aryl, or an aralkyl group and an aromatic para-amino-hydroxy-compound to a reaction leading to the formation of an indophenol.

3. As new products dihydroindole-leuco-indophenole having most probably the formula:—

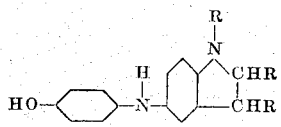

wherein R stands for hydrogen, an alkyl, aryl or an aralkyl group which crystallize from dilute sodium chloride solutions in yellow crystals, are easily soluble in water, alcohol and sulfuric acid and form with aqueous caustic soda colorless solutions which by standing in the air change to dark red to blue solutions containing the corresponding indophenols.

4. As new products dihydroindole-leuco-indophenols having most probably the formula

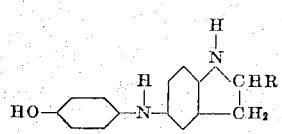

wherein R stands for an alkyl, aralkyl or aryl group which crystallize from dilute sodium chloride solutions in yellow needles, are easily soluble in water, alcohol and sulfuric acid and form with aqueous caustic soda colorless solutions which by standing in the air change to dark red solutions containing the corresponding indophenols.

5. As a new product the 2-monophenyl-dihydroindole-leuco-indophenol having most probably the formula:—

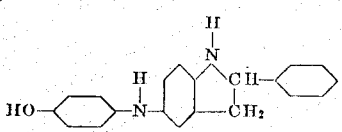

which crystallizes from dilute sodium chloride solution in yellow needles, is easily soluble in water, alcohol and sulfuric acid and forms with aqueous caustic soda colorless solutions which by standing in the air change to dark red solutions containing the 2-monophenyl-dihydroindole-indophenol.

6. As new products, dihydroindole-indophenolic bodies, which in form of their leuco derivatives have most probably the formula:

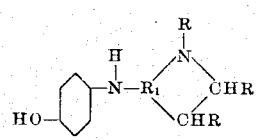

wherein R stands for hydrogen, an alkyl, aryl, or an aralkyl group, and $R_1$ stands for a benzene nucleus to which NH and NR are joined in para-position and which may be substituted by alkyl, aryl, aralkyl, halogen or other monovalent group and which can be obtained by the process of claim 1.

In testimony whereof, I affix my signature.
FRITZ BALLAUF.